(12) United States Patent
Iwata et al.

(10) Patent No.: US 6,456,578 B2
(45) Date of Patent: Sep. 24, 2002

(54) OPTICAL DISK APPARATUS

(75) Inventors: Katsuo Iwata; Yutaka Kashihara, both of Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/818,967

(22) Filed: Mar. 28, 2001

Related U.S. Application Data

(62) Division of application No. 09/271,270, filed on Mar. 17, 1999.

(30) Foreign Application Priority Data

Mar. 17, 1998 (JP) .......................................... 10-067422

(51) Int. Cl.$^7$ ................................................. G11B 7/00
(52) U.S. Cl. ................................... 369/53.2; 369/53.37
(58) Field of Search ............................... 369/53.2, 53.1, 369/53.23, 44.41, 53.37

(56) References Cited

U.S. PATENT DOCUMENTS

| | | | | |
|---|---|---|---|---|
| 5,235,583 A | | 8/1993 | Jongenelis et al. | |
| 6,061,293 A | * | 1/2000 | Lee et al. | 369/44.25 |
| 6,061,318 A | * | 5/2000 | Hwang | 369/58 |
| 6,118,738 A | * | 9/2000 | Uehara | 369/34 |
| 6,243,341 B1 | * | 6/2001 | Hasimoto | 369/53.22 |
| 6,262,957 B1 | * | 7/2001 | Inoue et al. | 369/53.23 |

* cited by examiner

Primary Examiner—Nabil Hindi
(74) Attorney, Agent, or Firm—Pillsbury Winthrop LLP

(57) ABSTRACT

An optical disk apparatus comprises an optical pick-up unit for reproducing information on an optical disk, a first reproducer for processing an information signal obtained by the pick-up unit by one of a waveform slice method and a PRML method, and producing a first reproduction signal, a second reproducer for detecting a minimum value of a level of the information signal and producing a second reproduction signal, and a switch for selecting, as a reproduction information signal, one of the first and second reproduction signals, in accordance with a recording density of the optical disk to be reproduced.

7 Claims, 11 Drawing Sheets

OPTICAL DISK APPARATUS

This is a division of application Ser. No. 09/271,270, filed Mar. 17, 1999.

BACKGROUND OF THE INVENTION

The present invention relates to an optical disk apparatus using an optical disk.

In general, in an optical disk apparatus, a laser beam from a laser diode is focused by an optical system, and an optical disk is scanned with the focused beam. Thus, binary data recorded on the optical disk is read.

Normally, when the focused beam is radiated on the optical disk, if the entire spot of the focused beam is located outside the pits, the phase of all the reflected light is the same. Thus, no decrease occurs in the amount of reflected light due to optical interference. On the other hand, when a part of the spot of the focused beam is within the pit, a phase difference occurs between the reflected light from the inside of the pit and that from the outside of the pit. Consequently, both reflected light components interfere with each other and the amount of reflected light decreases. In general, the optical disk apparatus is so designed that the amount of reflected light becomes minimum when the center of the focused beam spot lands on the center of the pit. Specifically, when the entire of the focused beam spot is located outside the pit as shown in FIG. 22, the level of the reproduced signal is high. When a part of the focused beam spot begins to overlap the pit, the level of the reproduced signal begins to decrease. When the focused beam spot is located at the center of the pit, the reproduced signal level takes a lowest value.

The density in operation of the optical disk apparatus has increased every year. One of the techniques for achieving high density is a technique for reducing the diameter of the focused beam. This requires a decrease in wavelength of a laser and an increase in NA (Numerical Aperture) of an objective lens. With the reduction of the diameter of the laser beam, information can be reproduced from smaller pits.

Even with the high-density optical disk apparatus wherein the focused beam diameter is reduced, however, information needs to be reproduced from a low-density optical disk which has already been marketed. In this case, as is understood from the relationship between the focused beam and the pit when information is to be reproduced from the low-density optical disk by the high-density optical disk apparatus, if the focused beam is located at the center of the pit, most of the focused beam is located within the pit as shown in FIG. 23 and the phase of most reflected light becomes the same. At this time, a decrease in the amount of reflected light due to interference is small. Specifically, when the focused beam is located outside the pit, the reproduced signal level is high. When the focused beam begins to overlap the pit, the reproduced signal level decreases. When the focused beam is at the center of the pit, the reproduced signal level increases once again. This phenomenon in which the reproduced signal level increases at the center of the pit is referred to as "rebounding".

Because of the rebounding, the reproduced signal level increases at the center of the pit, too, as shown in FIG. 24. Where the reproduced waveform in this case is detected by a waveform slice method, erroneous detection will occur even if the threshold is set at any level. When information is reproduced from the low-density optical disk by the high-density optical disk apparatus, as described above, there is a problem in that an error occurs in the signal detection result due to the rebounding.

In such an optical disk apparatus, there is a case where a compatibility capable of reproducing information among various types of optical disks having different recording densities such as CD (CD-ROM, CD-R etc.), DVD RAM, high density DVD-ROM and high density DVD-RAM of the coming generation is required.

Since, however, both the optimum wavelength of a light source and the shape of a light beam spot on the optical disk vary from optical disk type to optical disk type, it is generally difficult to correctly reproduce information from the plural types of optical disks by an optical disk drive using an optical head having a single light source and a single objective lens. Moreover, it is unfavorable to combine a plurality of light sources and a plurality of objective lenses in order to allow information from being reproduced from the plural types of optical disks having different recording densities because the optical head is increased in size and costs.

To resolve the above problem, for example, Jpn. Pat. Appln. KOKAI publication No. 8-339572 proposes an optical disk drive whose optical head is provided with a single light source, a single objective lens, and an opening limitation element having a plurality of openings of different sizes for limiting an opening of the objective lens to allow information to be reproduced from a plurality types of optical disks having different recording densities. In this optical disk drive, the diameter of a light beam spot on each of the optical disks is varied by the opening limitation element in accordance with the size of a pit corresponding to the recording density of an optical disk thereby to reproduce information from the plurality of types of optical disks having different recording densities.

On the other hand, in the conventional optical disk apparatus, in order to enable information reproduction from a plurality of kinds of optical disks with different recording densities, the recording density (size of pits) of the optical disks is merely considered and the opening size of an opening limiting element is varied. Since the opening size of the opening limiting element is not set in this apparatus in consideration of the relationship among the recording density of the optical disk, the light source wavelength and the pit depth of the optical disk, good reproduction is not achieved in the case of information reproduction from an optical disk which does not meet the conditions for the light source wavelength and pit depth. For example, the reproduced signal intensity decreases, or asymmetry of reproduced signals increases.

BRIEF SUMMARY OF THE INVENTION

An object of the present invention is to provide an optical disk apparatus wherein no error occurs in signal detection even if rebounding occurs in a reproduced waveform.

Another object of the invention is to provide an optical disk apparatus capable of exactly reproducing information from a plurality of kinds of optical disks with different recording densities, with a structure using a single light source and a single objective lens.

The present invention provides an optical disk apparatus for reproduction, comprising a pick-up unit which reads information from an optical disk, the information being recorded on the optical disk in a form of pits, and produces an information signal by photoelectric conversion, a first reproducer which processes the information signal by one of a waveform slice method and a PRML method, and produces a reproduction signal, a second reproducer which detects a minimum value of a level of the information signal and producing a reproduction signal, and a switch which selects, as a reproduction information signal, one of the reproduction signal produced by the first reproducer and the reproduction signal produced by the second reproducer, in accordance with a recording density of the optical disk to be reproduced.

With the above structure, information can be reproduced from a low-density optical disk even with use of a high-density optical disk apparatus wherein a focused beam size is reduced.

This invention also provides an optical disk apparatus comprising a pick-up unit including a light source, an objective lens which focuses a light beam emitted from the light source onto an optical disk, and a photo-detector which detects reflection light from the disk, the pick-up unit reproducing information recorded on the disk along a pre-determined track, and an opening limiting unit which limits an opening of the objective lens such that numerical apertures $NA1r$ and $NA1t$ in a disk radial direction and a track tangential direction of the objective lens in a case where the optical disk is a first disk optimized with respect to a wavelength $\lambda 1$ of the light source, and numerical apertures $NA2r$ and $NA2t$ in the disk radial direction and the track tangential direction of the objective lens in a case where the optical disk is a second disk optimized with respect to a wavelength $\lambda 2$ ($\lambda 1 < \lambda 2$) of the light source, satisfy formulae:

$$0.95 \cdot \frac{\lambda 1}{\lambda 2} \cdot NA1r \leq NA2r \leq 1.1 \cdot \frac{\lambda 1}{\lambda 2} \cdot NA1r$$

$$0.95 \cdot NA1t \leq NA2t \leq 1.1 \cdot NA1t$$

$$0.95 \cdot NA1t \leq NA2t \leq 1.1 \cdot NA1t$$

The present invention also provides an optical disk apparatus comprising a pick-up unit including a light source, an objective lens which focuses a light beam emitted from the light source onto an optical disk, and a photo-detector which detects reflection light from the disk, the pick-up unit reproducing information recorded on the disk along a pre-determined track, and an opening limiting unit which limits an opening of the objective lens such that numerical apertures in a disk radial direction and a track tangential direction of the objective lens are made equal in a case where the optical disk is a first disk having a predetermined recording density and optimized with respect to a wavelength $\lambda 1$ of the light source, and the numerical aperture in the disk radial direction of the objective lens is made less than that in the track tangential direction of the objective lens in a case where the optical disk is a second disk having a recording density lower than the first disk and optimized with respect to a wavelength $\lambda 2$ ($\lambda 1 < \lambda 2$) of the light source.

Furthermore, this invention provides an optical disk apparatus comprising a pick-up unit including a light source, an objective lens which focuses a light beam emitted from the light source onto an optical disk, and a photo-detector which detects reflection light from the disk, the pick-up unit reproducing information recorded on the disk along a pre-determined track, and an opening limiting unit which limits an opening of the objective lens such that a beam spot shape on the optical disk is the same in a disk radial direction and a track tangential direction of the optical disk in a case where the light source has a wavelength $\lambda 1$ and the optical disk is a first disk having a predetermined recording density, and the beam spot shape on the optical disk is large in the disk radial direction and small in the track tangential direction in a case where the optical disk is a second disk having a recording density lower than the first disk and optimized with respect to a wavelength $\lambda 2$ ($\lambda 1 < \lambda 2$) of the light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
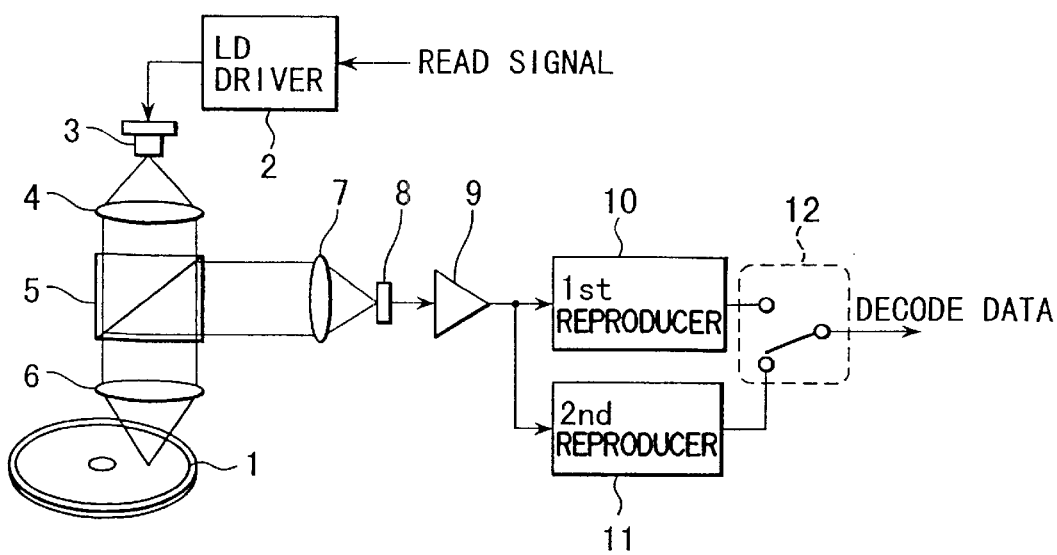
FIG. 1 schematically shows a structure of an optical disk apparatus according to an embodiment of the present invention.

According to an optical disk apparatus shown in FIG. 1, a read signal (READ signal) is input to a laser diode driver (LD driver) 2 of a pick-up unit to drive a laser diode 3, whereby information recorded on an optical disk 1 is read out. Specifically, if the laser diode 3 is driven, a laser beam is output from the laser diode 3 and is focused on the optical disk 1 through a collimate lens 4, a beam splitter 5 and an objective lens 6. Reflected light from a pit stream on the optical disk 1 is reflected by the beam splitter 5 and made incident on a focusing lens 7. The focusing lens 7 focuses the reflected light on a photo-detector 8.

The photo-detector 8 outputs an electric signal, which corresponds to the incident reflected light, to a first reproducer 10 via an amplifier 9 of a signal processing unit. The first reproducer 10 processes the amplified signal by means of a wave slice method or a PRML (Partial Response Maximum Likelihood) method, thereby producing a reproduced signal.

In this invention, a second reproducer 11 is provided in parallel to the first reproducer 10 in rear of the amplifier 9. A switch 12 is provided in rear of the first and second reproducers. The switch 12 is operated to select one of the outputs from the first and second reproducers 10 and 11 in accordance with the kind of the reproduced optical disk. For example, the optical characteristics of the optical disk, e.g. CD or DVD (particularly high density DVD), are determined on the basis of an output signal from the photo-detector 8, and the switch 12 is operated in accordance with the determination result. Specifically, it is determined whether the reproduced signal is being normally reproduced, and if the reproduced signal is detected as noise, the switch 12 is changed over. This operation of the switch is effected by a controller provided on the disk apparatus, although not shown.

In the above structure, if the output of the amplifier 9, i.e. the amplified reproduced signal, is supplied to the second reproducer 11, a minimum value of the reproduced signal level is detected by the second reproducer 11 and one of the outputs of the first and second reproducers 10 and 11 is selected by the switch 12 in accordance with the kind of the reproduced optical disk.

The structure and operation of the second reproducer of the present invention will now be described with reference to FIGS. 2 and 3.

Figure 2:
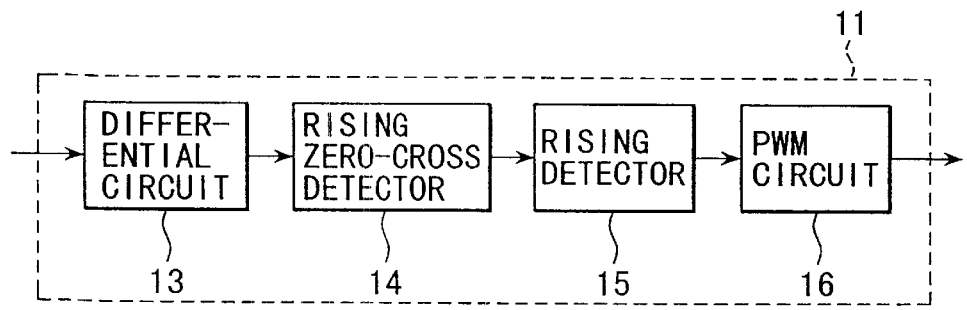
FIG. 2 is a block diagram showing a second reproducer used in the optical disk apparatus shown in FIG. 1.
Figure 3:
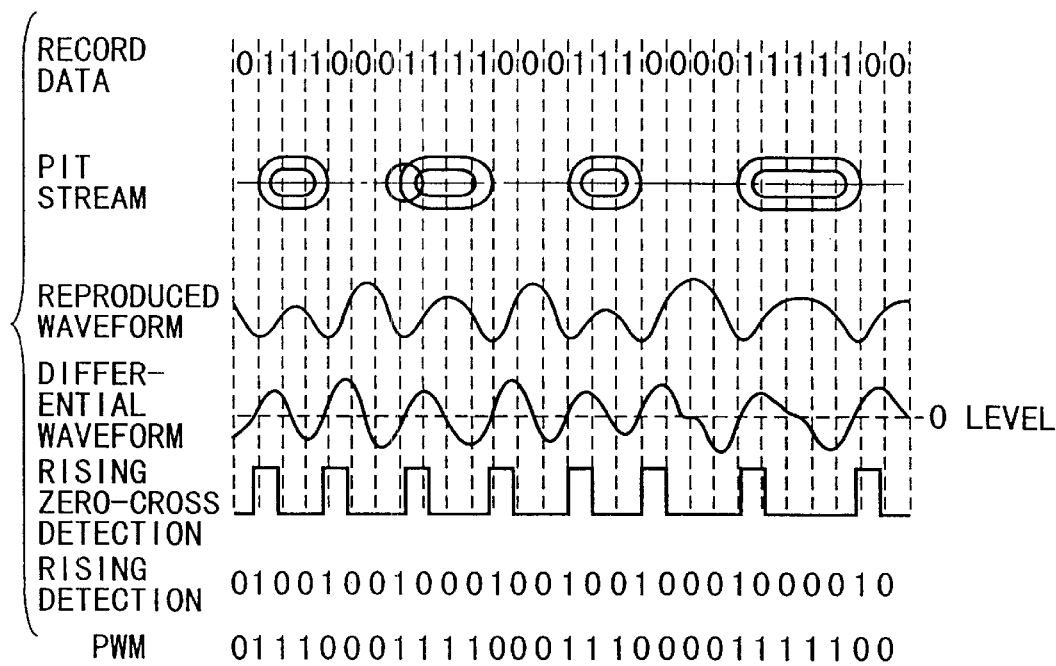
FIG. 3 is an operational waveform diagram in a case where the present invention is applied.

As is shown in FIG. 2, the second reproducer 11 comprises a differential circuit 13, a rising zero-cross detector 14, a rising detector 15 and a PWM (Pulse Width Modulation) circuit 16.

In the second reproducer 11 with the above structure, if the reproduced signal is input to the differential circuit 13, the waveform of the reproduced signal is differentiated. The differentiated waveform, as shown in FIG. 3, zero-crosses at extreme values of the reproduced waveform. If the differentiated waveform is input to the rising zero-cross detector 14, the rising zero-cross detector 14 detects points where the polarity of the differentiated waveform changes from negative to positive, and outputs detection pulses to the rising detector 15. The rising detector 15 detects the rising edge of the pulse and sets a code bit "1" at the detection point and a code bit "0" at other points. If the output signal of the rising detector 15 is input to the PWM circuit 16, the PWM circuit 16 subjects the output signal of the rising circuit 15 to PWM and thus produces decode data.

Figure 5:
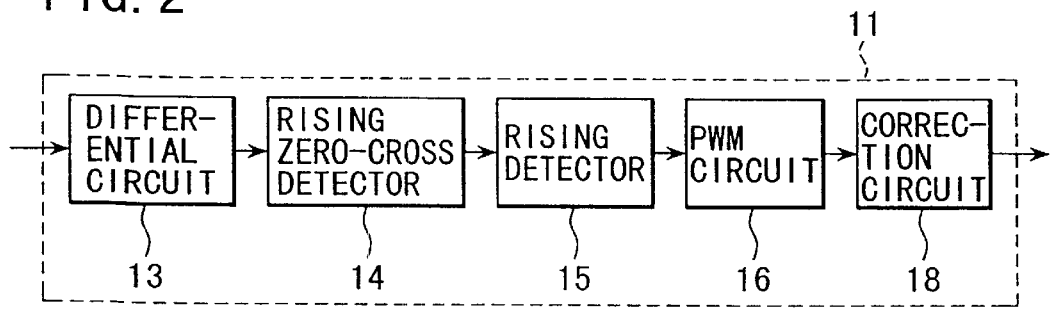
FIG. 5 is a block diagram of the second reproducer including the correction circuit.
Figure 4:
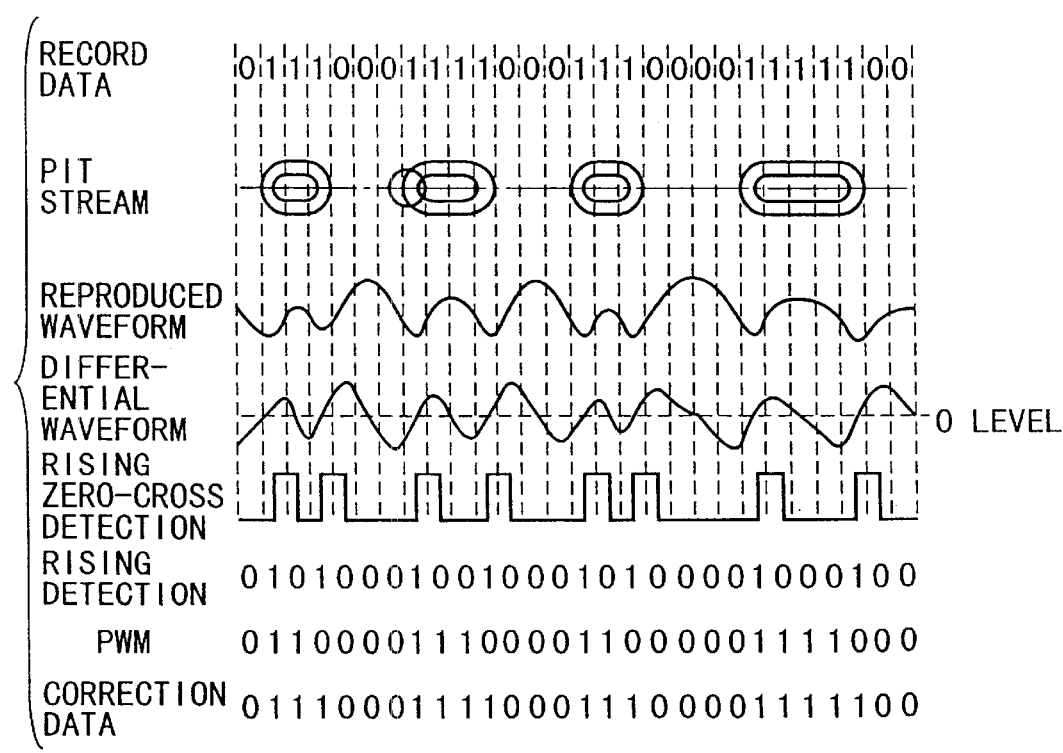
FIG. 4 is an operational waveform diagram in a case where the second reproducer including a correction circuit is used.

The bit stream after PWM does not necessarily coincide with the record data. For example, as shown in FIG. 4, if the bit stream after PWM is compared with the record data, coded bit "0" appears at the rear end of a train of successive coded bits "1". Reversely, coded bit "1" may appear at the rear end of a train of successive coded bits "0" (not shown). It can be estimated from the specifications of the optical disk to be reproduced what difference arises between the stream after PWM and the record data. If a correction circuit 17 is provided at the rear stage of the PWM circuit 16, as shown in FIG. 5, decoding can be correctly performed.

Figure 6:
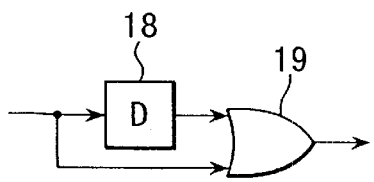
FIG. 6 is a circuit diagram of a correction circuit which increases a continuous length of code bits "1" by one pit.

For example, when the bit stream after PWM conversion is compared with the record data, if the coded bit "0" appears at the rear end of the train of successive coded bits "1", the correction circuit 17 comprising a delay circuit 18 and an OR circuit 19, as shown in FIG. 6, is provided at the rear stage of the PWM circuit 16 to perform data correction. Thus, decoded data coinciding with the record data can be obtained. Specifically, if coded bit "1" is input to the delay circuit 18 and input to the OR gate 19 with a delay of a one-bit period, coded bit "1" is output from the OR gate even if the next PWM coded bit becomes "0". Accordingly, corrected data corresponding to the record data is obtained.

Figure 7:
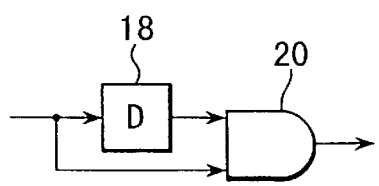
FIG. 7 is a circuit diagram of a correction circuit which increases a continuous length of code bits "0" by one pit.

On the other hand, when the bit stream after PWM conversion is compared with the record data, if the coded bit "1" appears at the rear end of the train of successive coded bits "0", the correction circuit 17 comprising a delay circuit 17 and an AND circuit 20, as shown in FIG. 7, is provided at the rear stage of the PWM circuit 16 to perform data correction. Thus, decoded data coinciding with the record data can be obtained. Specifically, if coded bit "0" is input to the delay circuit 17 and input to the AND gate 20 with a delay of a one-bit period, coded bit "0" is output from the AND gate even if the next PWMs coded bit becomes "1". Accordingly, corrected data corresponding to the record data is obtained.

In the above embodiment, a filter for emphasizing an amplitude of a differential waveform may be provided in a case where the rebound is small and the amplitude of the differential waveform obtained from the differential circuit 13 of the second reproducer 11 is small. Thereby, a signal with a small rebound can be reproduced with high precision.

Figure 8:
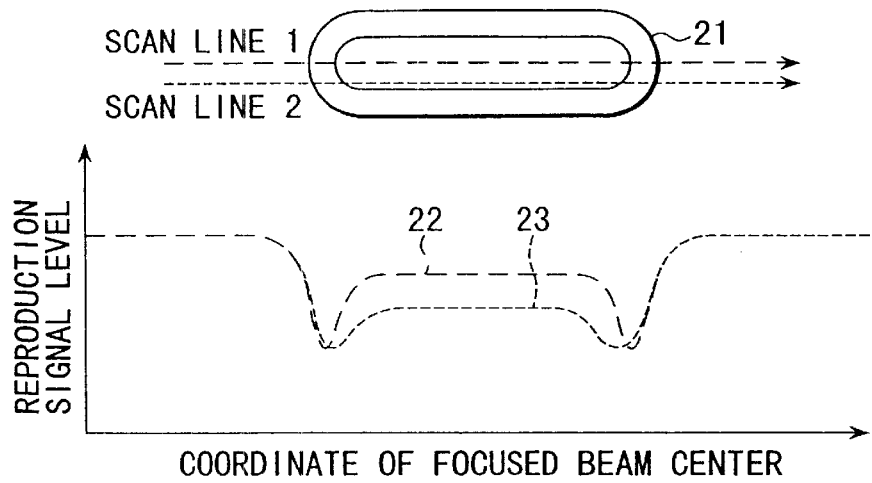
FIG. 8 shows a reproduced waveform in a case where there is a tracking off-set.

FIG. 8 shows a variation in a reproduced waveform due to off-track when a rebound is occurring. The rebound amount obtained when the laser beam spot scans a first scan line 1 extending through the center of a pit 21, that is, a reproduction signal level 22, is greater than the rebound amount obtained when the spot scans a second scan line 2 extending off the center of the pit 21, that is, a reproduced signal level 23 corresponding to the rebound amount due to off-track. Specifically, the rebound amount due to off-track is less than that due to on-track. The focused beam can thus scan the track center if a tracking control is performed so that the reproduced signal level may take a maximum value at the center of the pit on the basis of the reproduced waveform. This tracking control can be achieved by delivering the reproduced signal due to on-track to the tracking control circuit of the optical disk apparatus.

Figure 9:
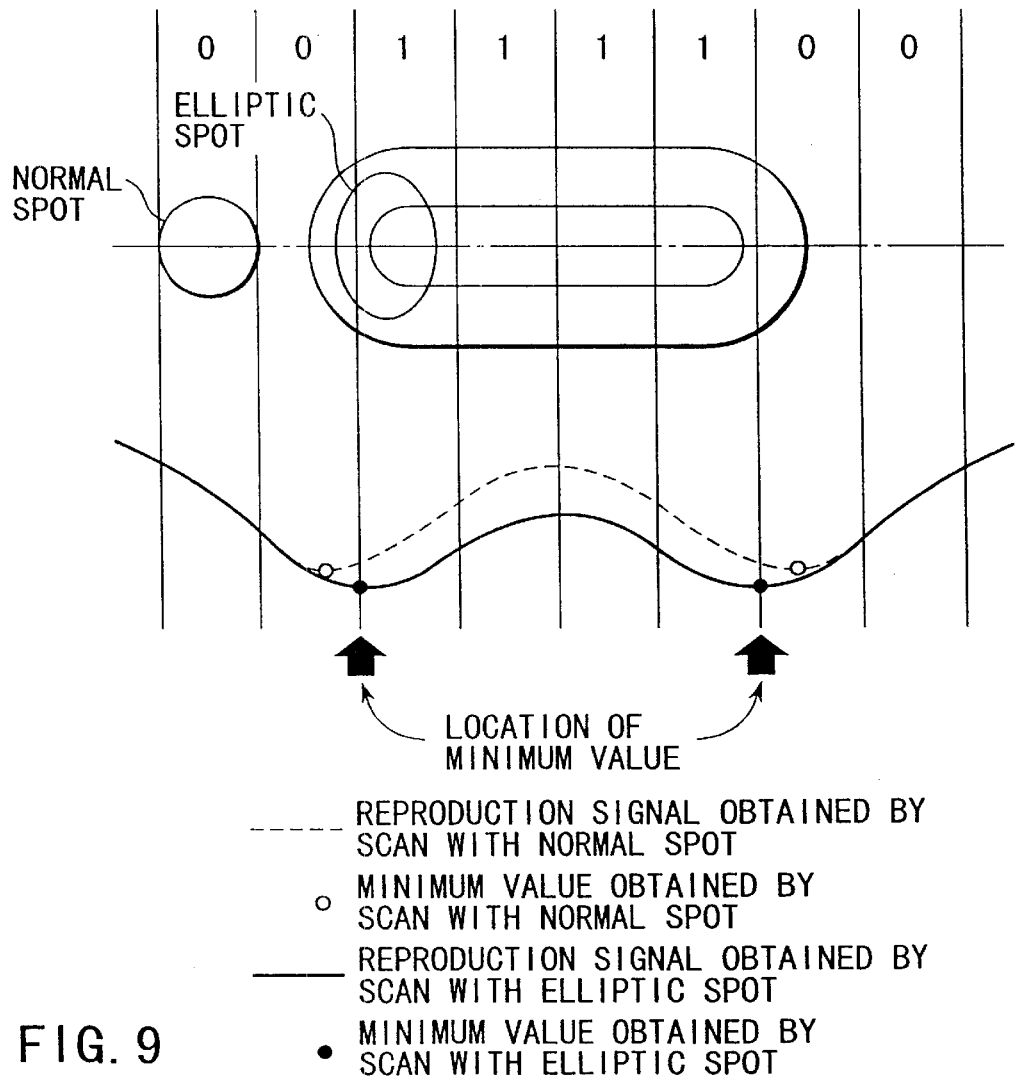
FIG. 9 shows a first correction example of a very small portion due to deformation of a spot shape.
Figure 10:
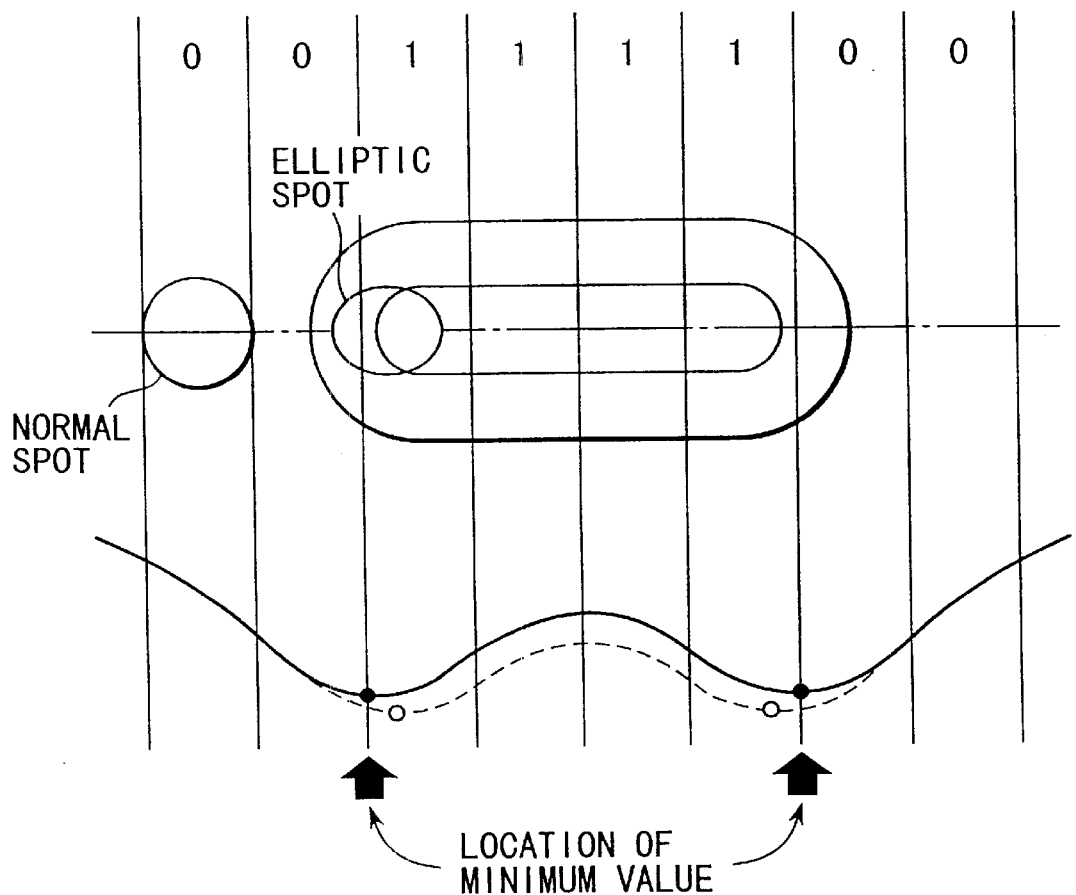
FIG. 10 shows a second correction example of a very small portion due to deformation of a spot shape.

When the signal detection is effected by detecting the minimum value of the reproduced signal, the location of the minimum value is not necessarily at the optimal point. For example, as shown in FIG. 9, the minimum value of the reproduced signal obtained with a normal spot (substantially circular) is displaced outside the optimal point. In this case, by changing the shape of the spot to a vertically elongated elliptic shape, the location of the minimum value is shifted to the inside and made closer to the optimal point. Inversely, in FIG. 10, the minimum value of the reproduced signal obtained with the normal spot (substantially circular) is displaced inside the optimal point. In this case, by changing the shape of the spot to a horizontally elongated elliptic shape, the location of the minimum value is shifted to the outside and made closer to the optimal point.

As has been described above, when the location of the minimum value of the reproduced signal is displaced from the optimal point, the shape of the spot is changed so that the location of the minimum value may be closer to the optimal point.

Figure 11:
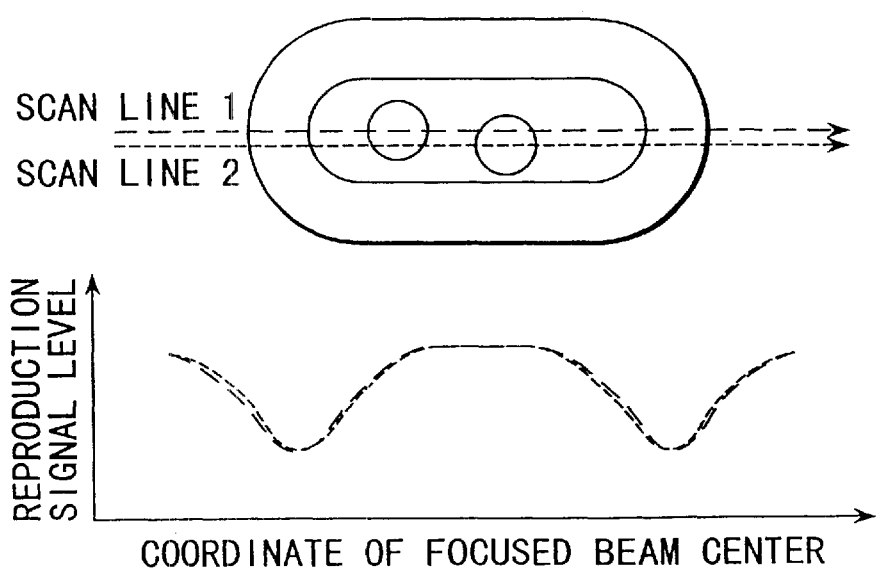
FIG. 11 shows an example wherein tracking cannot be performed with a normal spot shape.

In a system wherein the tracking is made to increase the rebound amount to a maximum, there is a case where optimal tracking cannot be performed due to the relationship between the pit and the spot. For example, in a case illustrated in FIG. 11, all the beam spot resides on a bottom portion of the pit near the center of the pit, irrespective of the scan lines 1 and 2. In this case, the rebound amount of the reproduced signal is equal when the spot scans the scan lines 1 and 2.

Figure 12:
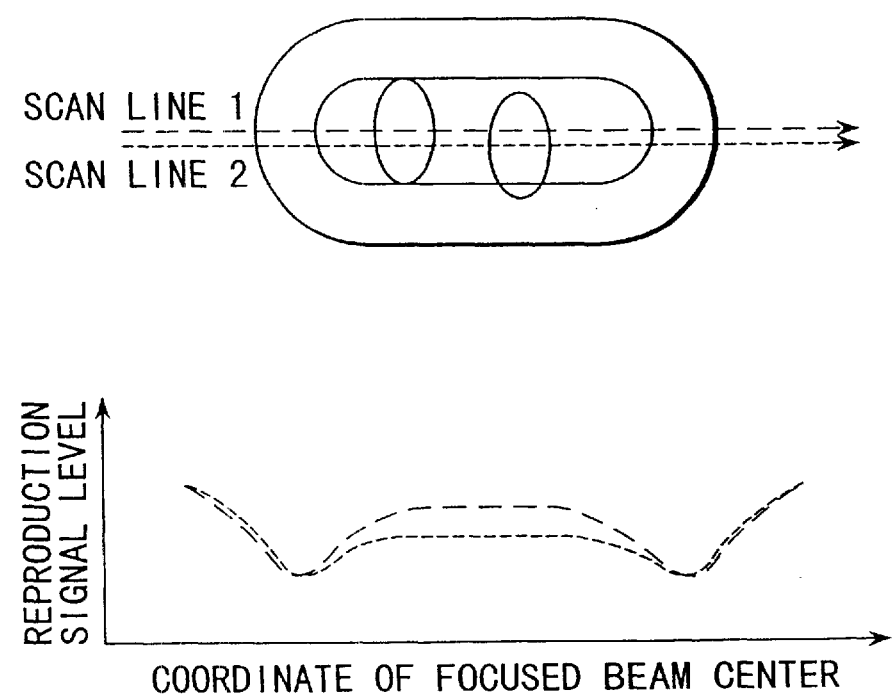
FIG. 12 shows improvement of tracking performance due to deformation of a spot shape.

In order to solve this problem, the spot shape is changed to a vertically elongated elliptic shape, as shown in FIG. 12. By changing the spot shape to the vertically elongated elliptic shape, all the spot enters the bottom portion of the pit when the spot scans the scan line 1 and part of the spot overlaps a wall portion of the spot when the spot scans the second scan line 2. That is, the difference in rebound amount takes a maximum value only when the spot scans the scan line 1, and exact tracking can be effected.

The mechanism for changing the beam spot shape, as described above, can be realized by inserting an opening limiting element between the objective lens and the beam splitter as described hereinafter.

As has been described above, according to the present invention, the location of a negative extreme value is detected from the reproduced waveform with the rebound. The coded bit at the detected location is determined to be "1" and the coded bit at other locations is determined to be "0". Subsequently, the result of determination is subjected to PWM so that no error may occur in signal detection even when the rebound occurs in the reproduced waveform.

Figure 13:
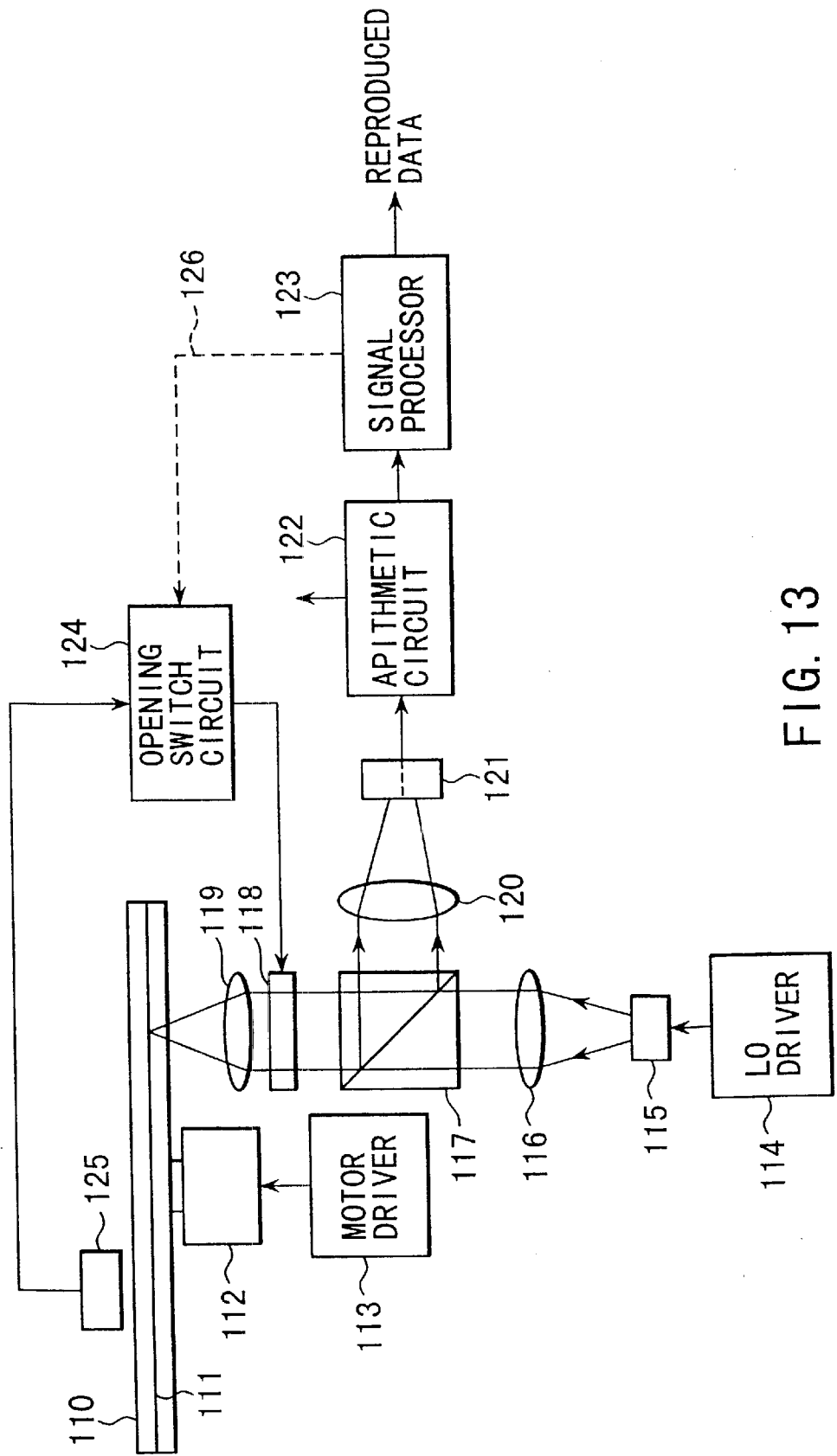
FIG. 13 schematically shows a structure of an optical disk apparatus according to a second embodiment of the invention.

An optical disk apparatus according to a second embodiment of the invention will now be described with reference to FIG. 13. In FIG. 13, an optical disk 110 is, for example, a read-only optical disk and comprises a transparent substrate having pit streams representing record information, a reflection layer or a recording layer (hereinafter referred to as "reflection/recording layer") 111 formed on the transparent substrate, and a protection layer formed on the reflection/recording layer 111. Where the reflection/recording layer 111 is a recording layer, it may be formed of any material capable of recording information with radiation of a light beam. For example, a phase change medium layer or a photo-magnetic layer may be used as the reflection/recording layer 111.

When information is to be reproduced from the optical disk 110, the disk 110 is rotated by a spindle motor 112 driven by a motor driver 113 and a laser diode (LD) 115 is driven by an LD driver 114 to emit a light beam. The light beam emitted from the semi-conductor laser 115 is converted to a collimated light flux through a collimator lens 116 and the collimated light flux is made incident on the objective lens 119 through a beam splitter (half prism) 117 and an opening limiting element 118 (to be described later in detail). The beam is then focused on the reflection/recording layer 111 of optical disk 110 by the objective lens 119, and a small beam spot is formed on the reflection/recording layer 111.

The reflected light from the reflection/recording layer 111 of disk 110 is returned through the objective lens 119 and opening limiting element 118 in a direction reverse to the direction of the incident beam on the disk 110. The reflection light is guided to a focusing lens 120 via the beam splitter 117 and then focused on a photo-detector 121 by the focusing lens 120. The photo-detector 121 is a pluralsegment split photodetector having a light-receiving surface divided into plural segments, e.g. two segments or four segments (i.e. two- or four-segment split photo-detector). An output from the photo-detector 121 is input to an arithmetic circuit 122.

The arithmetic circuit 122 subjects the output from the photo-detector 121 to addition/subtraction operations, thereby producing a reproduction signal corresponding to the information recorded on the optical disk 110, a focus error signal, and a tracking error signal. Of these signals, the reproduction signal is delivered to a signal processor 123. The focus error signal and tracking error signal are delivered to a focus servo system and a tracking servo system, both not shown.

The signal processor 123 subjects the reproduction signal input from the arithmetic circuit 122 to processing such as equalization, binarization, demodulation and decoding, thus producing reproduction data. In addition, the signal processor 123 may have a function of determining the kind (track pitch, i.e. recording density) of the optical disk 110 on the basis of track pitch data included in physical format data reproduced from a read-in area of the optical disk 110, and outputting a determination result, as will be described later.

The opening limiting element 118 will now be described.

The opening limiting element 118 is an element for limiting the opening of the objective lens 119 and has a plurality of openings with different sizes, in particular, dimensions in the radial direction of the optical disk 110 (hereinafter referred to as "the disk radial direction"). These openings are switched by an opening switch circuit 124 shown in FIG. 13. The opening switch circuit 124 switches the opening by controlling the opening limiting element 118, for example, in accordance with a discrimination result from a disk discriminator 125 for determining the kind of the optical disk 110, or a discrimination result 126 of the signal processing by the signal processor 123.

Figure 14A:
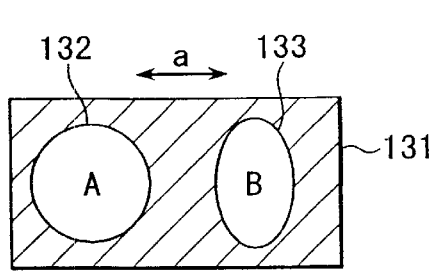
FIGS. 14A, 14B and 14C show specific structures of the opening limiting element used in the present invention.
Figure 14B:
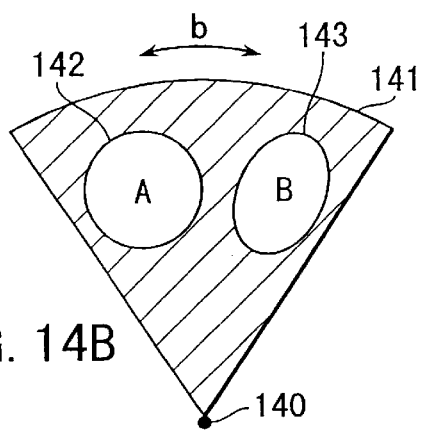
Figure 14C:
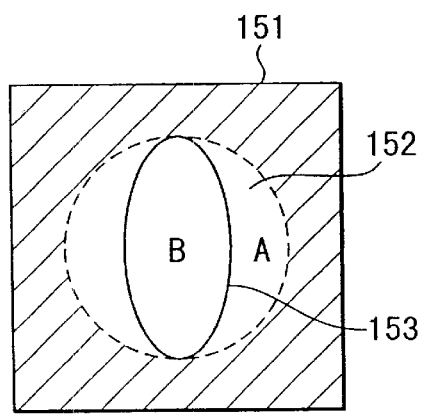

FIGS. 14A, 14B and 14C show various examples of the structure of the opening limiting element 118.

An opening limiting element, as shown in FIG. 14A, has a rectangular light shield plate 131 in which a circular opening 132 and an elliptic opening 133 are formed. The elliptic opening 133 has a short axis in the disk radial direction and a long axis in a track tangential direction on the optical disk 110. This opening limiting element is parallel-moved by the opening switch circuit 124 in a direction of double-headed arrow a, and thus one of the openings 132 and 133 is selectively put on the light incidence path to the objective lens 119 in FIG. 13.

An opening limiting element, as shown in FIG. 14B, has a sectorial light shield plate 141 in which a circular opening 142 and an elliptic opening 143 are formed. The elliptic opening 143 has a short axis in the disk radial direction and a long axis in the track tangential direction. This opening limiting element is rotated by the opening switch circuit 124 about a rotational axis 140 in a direction of double-headed arrow b, and thus one of the openings 142 and 143 is selectively put on the light incidence path to the objective lens 119 in FIG. 13.

An opening limiting element, as shown in FIG. 14C, is formed of a liquid crystal cell 151. An elliptic opening 153 having a short axis in the disk radial direction and a long axis in the track tangential direction is formed in a central portion of the liquid crystal cell 151. The cell 151 is controlled by the turn-on/off of application of voltage to the cell 151 or the magnitude of applied voltage. Specifically, when no voltage is applied to the liquid crystal cell 151, incident light is passed through the opening 153. When voltage is applied, a circular opening 152 is formed, as indicated by a broken line, and incident light is passed through the circular opening 152 which includes the opening 153. In this case, the control of voltage to the liquid crystal cell 151 is performed by the opening switch circuit 124.

In the following description, the openings 132, 142 and 152 shown in FIGS. 14A, 14B and 14C are generally referred to as circular opening A, and the openings 133, 143 and 153 as elliptic openings B. The circular opening A may be the same as the opening of the objective lens 119 and in this case the circular opening A is not needed.

In the optical disk apparatus having the above structure, the beam spot size on the reflection/recording layer 111 of optical disk 110 is inversely proportional to the numerical aperture (NA) of the objective lens 119 and proportional to the wavelength of the light beam, i.e. wavelength λ of the semiconductor laser 115 or the light source. Specifically, if the wavelength λ and the numeral aperture NA are determined, the shortest pit length representing information on the reflection/recording layer 111 and the optimal value of the track pitch are determined. Accordingly, the optical disk 110 is generally optimized with respect to the wavelength λ and the numeral aperture NA.

Since the optical disk 110 is optimized with respect to the wavelength λ and the numeral aperture NA, as mentioned above, an optical disk apparatus can basically reproduce information from only the optical disk matching with the wavelength λ and the numeral aperture NA of this apparatus. In the present embodiment, however, information can be reproduced from various kinds of optical disks if the opening of the objective lens 110 is changed by the opening limiting element 118 in accordance with the kind of the optical disk 110.

The details of the opening limiting function of the opening limiting element 118 in the optical disk apparatus according to the present embodiment and the advantages obtained by the opening limiting function will now be described.

The degree of modulation M and asymmetry A of the reproduction signal from the optical disk 110 which is output from the arithmetic circuit 122 are defined as follows.

Figure 15:
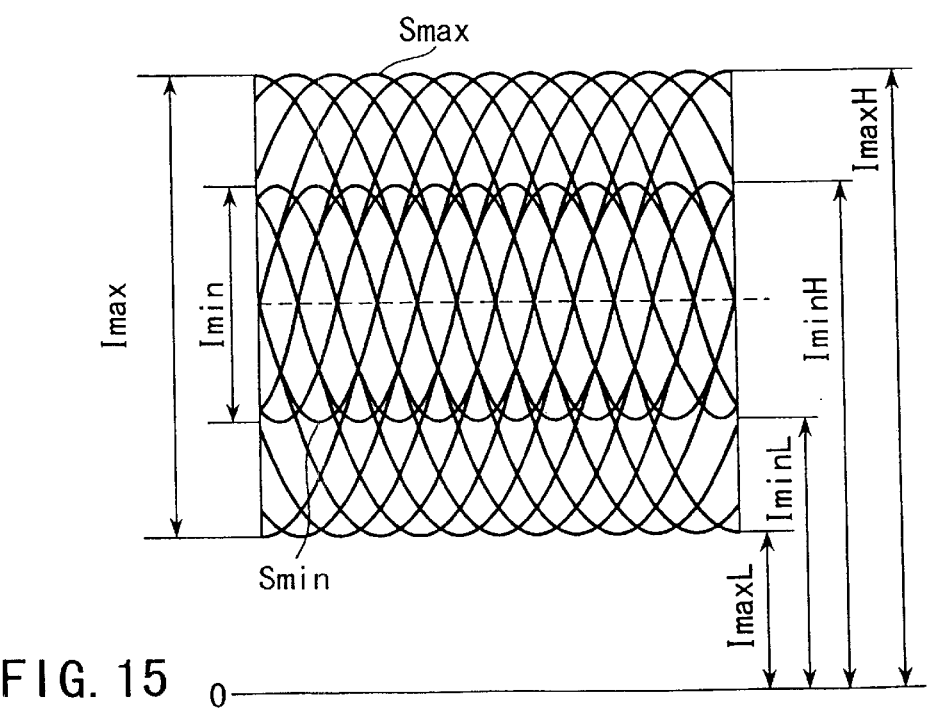
FIG. 15 is a view for explaining the definitions of a modulation degree and asymmetry of reproduced signals from the optical disk.

When the maximum level and minimum level of a reproduction signal Smin of repeat signals of shortest pits are IminH and IminL and the maximum level and minimum level of a reproduction signal Smax of repeat signals of longest pits are ImaxH and ImaxL in FIG. 15, the degree of modulation M and asymmetry A of reproduction signals are defined by $$M = \frac{I_{minH} - I_{minL}}{I_{maxH} - I_{maxL}} \quad (1)$$

$$A = \frac{(I_{maxH} - I_{maxL}) - (I_{minH} + I_{minL})}{2(I_{maxH} - I_{maxL})} \quad (2)$$

In general, in the optical disk apparatus, if the degree of modulation of a reproduction signal from the optical disk is M=0.2 or more and the asymmetry thereof is A=−0.05 to 0.15, it is considered that information can be correctly reproduced from the reproduction signal. Calculation results of the degree of modulation M and asymmetry A of reproduction signals obtained with various combinations of the optical disk apparatus and optical disks will be shown below and it is examined whether such combinations meet the above conditions.

One example of the combinations of the optical disk apparatus and optical disks may comprise an optical disk apparatus ("first optical disk apparatus") having a light source with wavelength λ1=410 nm and having an objective lens with numeral aperture NA=0.6, which will possibly be used as a short-wavelength light source in future, and an optical disk ("first disk") with a track pitch=0.42 μm and a shortest pit length=0.23 μm, which will prospectively be used as a so-called high-density DVD.

Figure 16:
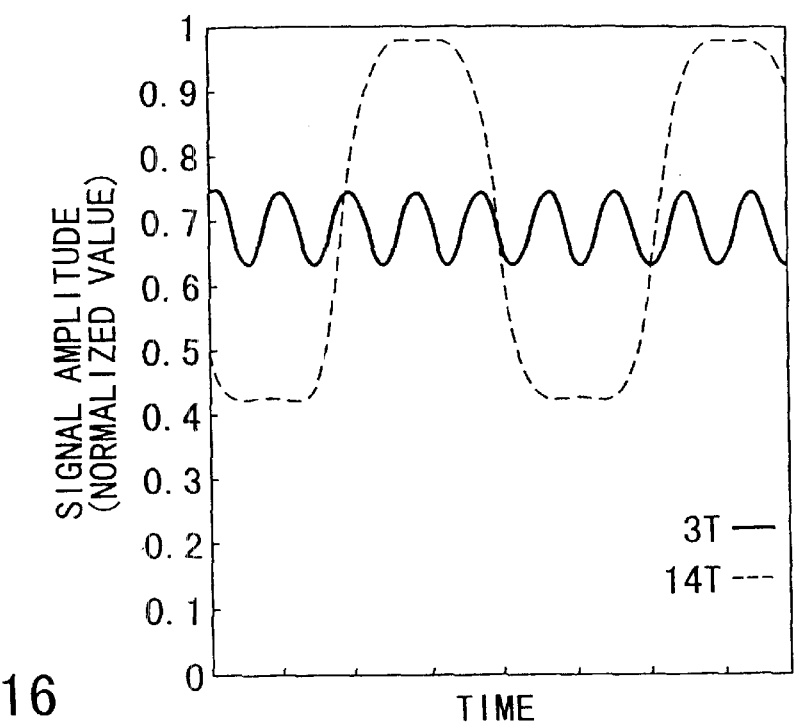
FIG. 16 shows a reproduced signal waveform in a case where information is reproduced from a first disk by a first optical disk apparatus.

FIG. 16 shows calculation results obtained with this combination, that is, calculation results of the repeat reproduction signal of a shortest pit (3T) and the repeat reproduction signal of a longest pit (14T) which were reproduced from the first disk by the first optical disk apparatus.

Another example of the combinations of the optical disk apparatus and optical disks may comprise an optical disk apparatus ("second optical disk apparatus") having a light source with wavelength λ2=650 nm and having an objective lens with numeral aperture NA=0.6, which is currently used as a modern DVD-ROM system or DVD-RAM system, and an optical disk ("second disk") with a track pitch=0.74 μm and a shortest pit length=0.4 μm.

Figure 17:
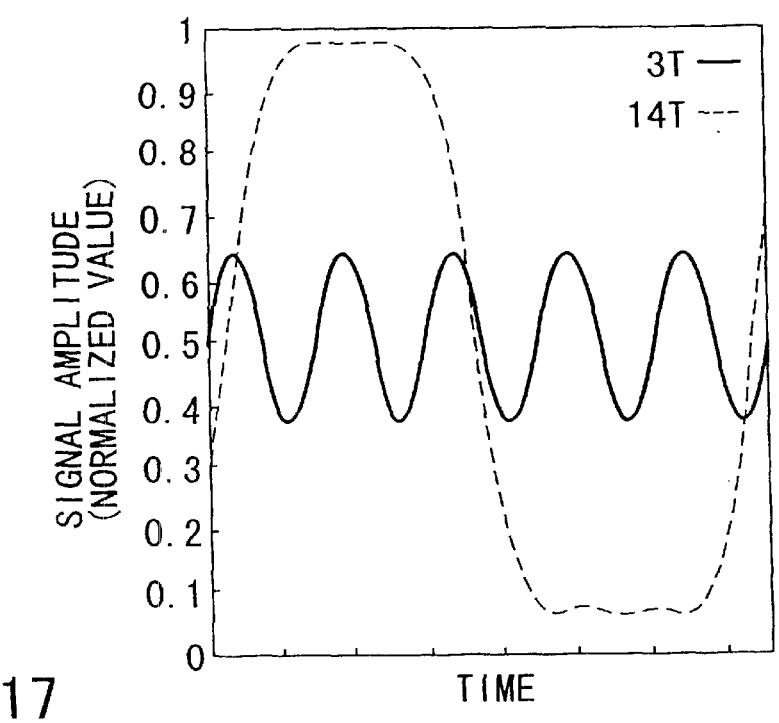
FIG. 17 shows a reproduced signal waveform in a case where information is reproduced from a second disk by a second optical disk apparatus.

FIG. 17 shows calculation results obtained with this combination, that is, calculation results of the repeat reproduction signal of a shortest pit (3T) and the repeat reproduction signal of a longest pit (14T) which were reproduced from the second disk by the second optical disk apparatus.

TABLE 1 shows in (CASE 1) and (CASE 5) the degree of modulation M and asymmetry A of the repeat reproduction signal obtained from the first disk by the first optical disk apparatus and the repeat reproduction signal obtained from the second disk by the second optical disk apparatus.

TABLE 1

| Optical disk apparatus | 1st disk apparatus | | | | 2nd disk apparatus |
|---|---|---|---|---|---|
| Light source wavelength | 410 nm | | | | 650 nm |
| Optical disk | 1st disk | 2nd disk | 2nd disk | 2nd disk | 2nd disk |
| NA (Radial direction/ tangent direction) | (0.6/0.6) | (0.6/0.6) | (0.36/0.36) | (0.36/0.6) | (0.6/0.6) |
| Modulation factor | 0.22 | 0.78 | 0.26 | 0.75 | 0.30 |
| Asymmetry | 0.082 | 0.207 | 0.189 | 0.140 | 0.017 |
| | (Case 1) | (Case 2) | (Case 3) | (Case 4) | (Case 5) |

The degree of modulation M and asymmetry A in (CASE 1) and (CASE 5) satisfy the above conditions, M=0.2 or more and A=−0.05 to 0.15. It is thus considered that exact information reproduction can be performed.

Figure 18:
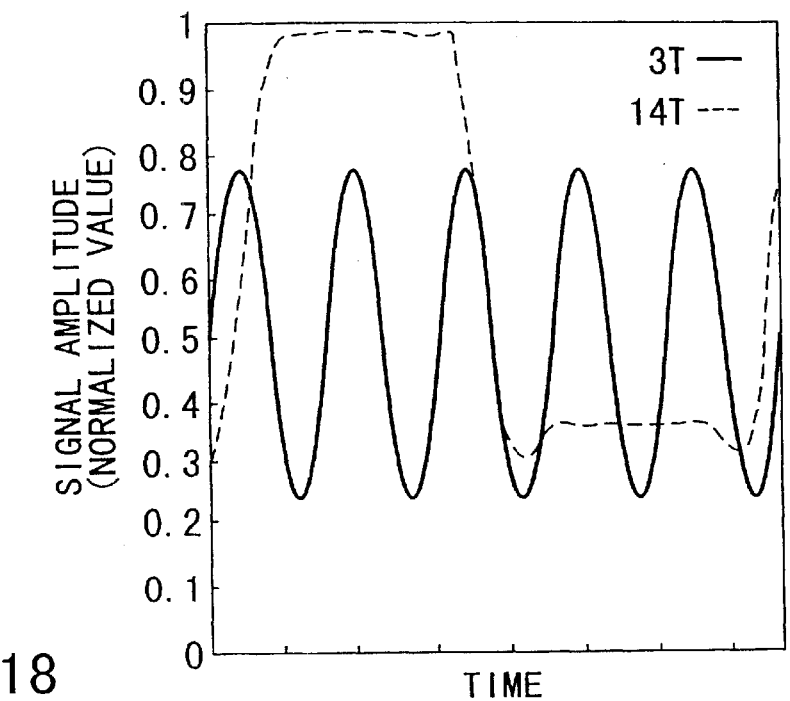
FIG. 18 shows a reproduced signal waveform in a case where information is reproduced from the second disk by the first optical disk apparatus.

FIG. 18 shows calculation results of the repeat reproduction signal of a shortest pit (3T) and the repeat reproduction signal of a longest pit (14T) which were reproduced from the second disk by the first optical disk apparatus. The degree of modulation M and asymmetry A of the reproduction signal in this case are shown in (CASE 1) in TABLE 1. Since the degree of modulation M and asymmetry A fail to satisfy the above conditions, A=−0.05 to 0.15, good information reproduction cannot be performed. The reason appears to be that the relationship among the wavelength λ1 of the light source, the beam spot size on the reflection/recording layer of the optical disk, and the shape of pits is not proper.

In the present embodiment, the condition of asymmetry is not satisfied. However, there may be a case where the condition of a modulation factor is not satisfied, depending upon the combination between an optical disk apparatus and an optical disk or a case where the conditions of both the modulation factor and the asymmetry are not satisfied.

Figure 19:
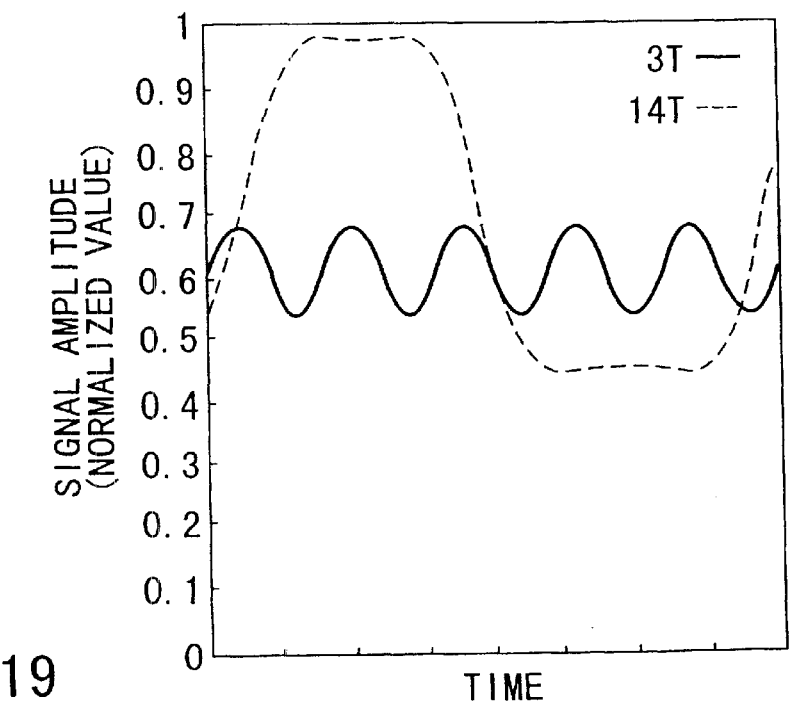
FIG. 19 shows a reproduced signal waveform in a case where information is reproduced from the second disk by the first optical disk apparatus with use of an elliptic opening having a numerical aperture of 0.36 in a radial direction of the disk and a numerical aperture of 0.36 in a tangential direction of the track.

FIG. 19 shows calculation results of the repeat reproduction signal of a shortest pit (3T) and the repeat reproduction signal of a longest pit (14T) which were reproduced from the second disk, which is the optical disk 100, with use of the first optical disk apparatus wherein the numerical aperture NA of the objective lens was set at 0.36 so that the beam spot size may become equal to that in the second optical disk apparatus. In this case, the degree of modulation M and asymmetry A of the reproduction signal are shown in (CASE 3) in TABLE 1 and fail to satisfy the above condition, A=−0.05 to 0.15. Thus, good information reproduction cannot be performed.

However, if the opening of the objective lens 119 is limited from circular opening A to elliptic opening B by the opening limiting element 118 in the optical disk apparatus (first optical disk apparatus) according to the present embodiment shown in FIG. 13, the beam spot shape on the reflection/recording layer 111 can be optimized. Thus, the reproduction signal capable of exactly reproducing information from the second disk can be obtained.

Figure 20:
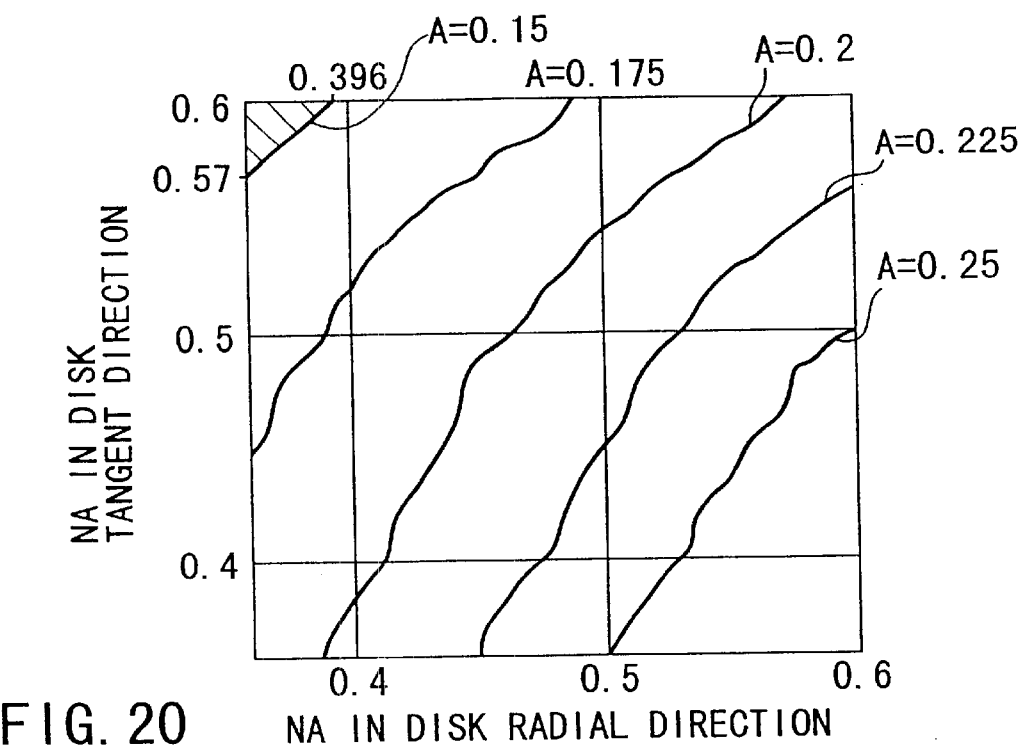
FIG. 20 is a view for describing the optical disk apparatus according to the another embodiment of the invention and specifically shows an NA dependency characteristics of asymmetry of reproduced signals from the optical disk.

FIG. 20 shows calculation results of the asymmetry A of the reproduction signal reproduced from the second disk with use of the optical disk apparatus (first optical disk apparatus) shown in FIG. 13 wherein the numerical aperture NA in the disk radial direction and the numerical aperture NA in the track tangential direction of the objective lens 119 were varied. It is understood from FIG. 20 that a hatched region, where the NA in the disk radial direction is 0.396 or less and the NA in the track tangential direction is 0.57 or more, satisfies the condition, A=−0.05 to 0.15. In other words, it is understood that where information is reproduced from the second disk by the first optical disk apparatus, the asymmetry is improved as the NA in the disk radial direction is decreased and the NA in the track tangential direction is increased.

When the objective lens 119 is mass-produced, it is generally difficult to produce lenses with the numerical aperture NA=0.66. It is thus desired that the upper limit of the NA in the track tangential direction be set at 0.66. In addition, if the NA in the disk radial direction is decreased, the beam spot size in the disk radial direction increases and leak from adjacent tracks increases. It is thus desired that when the NA in the disk radial direction of the objective lens 119 is limited by the opening limiting element 118, the lower limit of the NA be set at 0.35 in order to make the beam spot size substantially equal to that in the case of reproducing information from the second disk by the second optical disk apparatus.

In brief, when information is reproduced from the second disk by the first optical disk apparatus, the numerical apertures NA2r and NA2t in the disk radial direction and track tangential direction, with which the reproduction signal capable of exactly reproducing information, are given by $$0.35 \leq NA2r \leq 0.396 \quad (3)$$

$$0.57 \leq NA2t \leq 0.66 \quad (4)$$

Figure 21:
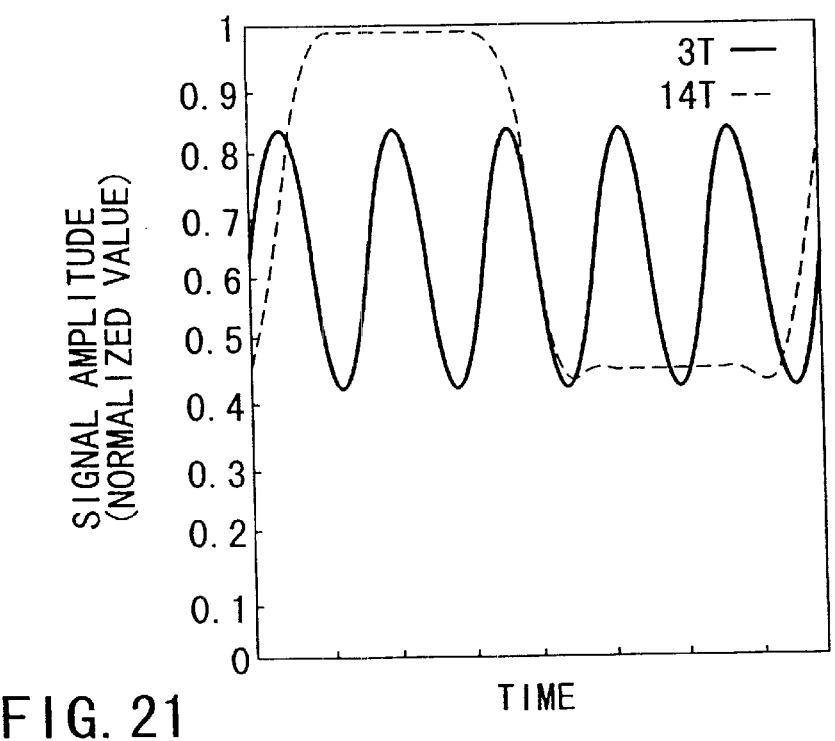
FIG. 21 shows a reproduced signal waveform in a case where information is reproduced from the second disk by the first optical disk apparatus with use of an elliptic opening having a numerical aperture of 0.36 in a radial direction of the disk and a numerical aperture of 0.6 in a tangential direction of the track.
Figure 22:
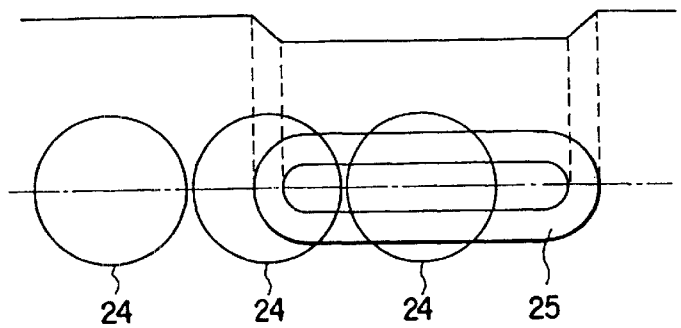
FIG. 22 shows a conventional state of the light beam focused on the optical disk.
Figure 23:
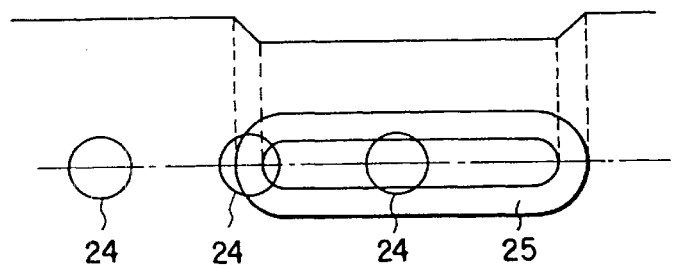
FIG. 23 shows a state of the focused light beam when rebounding occurs.
Figure 24:
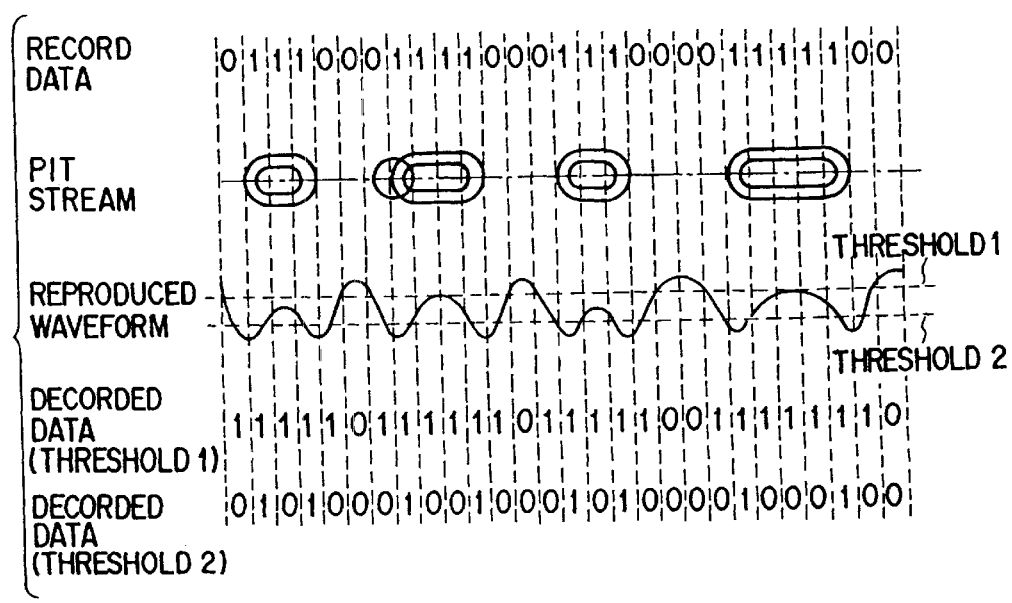
FIG. 24 shows an operational waveform diagram in a case where the rebound occurs.

FIG. 21 shows calculation results of the reproduction signal of a shortest pit (3T) and the repeat reproduction signal of a longest pit (14T) which were reproduced from the second disk, which is the optical disk 100, with use of the optical disk apparatus (first optical disk apparatus) shown in FIG. 13 wherein the elliptic opening B with numerical aperture NA=0.36 in the disk radial direction and numerical aperture NA=0.6 in the track tangential direction is set on the light incidence path to the objective lens 119. In this case, the degree of modulation M and asymmetry A of the reproduction signal are shown in (CASE 4) in TABLE 1 and satisfy the conditions, M=0.2 or more and A=−0.05 to 0.15. It is understood from these results that exact information reproduction can be performed by setting the beam spot shape with use of the proper opening limited by the opening limiting element 118.

Specifically, the influence of asymmetry due to the pit depth can be reduced by increasing the beam spot size in the disk radial direction and thus increasing the amount of beam radiation on an area other than the pit portion. Besides, since the optical resolution is enhanced by the reduction in beam spot size in the track tangential direction, the amplitude ratio (modulation factor) of a signal with highest density to a signal with lowest density can be increased and the influence of asymmetry can be reduced.

Moreover, since the beam spot size is proportional to the wavelength and inversely proportional to the numerical aperture NA, formulae (3) and (4) can be rewritten to the following formulae (5) and (6) by using the wavelength (λ) of the light source and the numerical aperture (NA) of the objective lens:

$$NA1r \cdot \frac{410}{650} \cdot 0.95 \leq NA2r \leq NA1r \cdot \frac{410}{650} \cdot 1.1 \quad (5)$$

$$NA1t \cdot 0.95 \leq NA2t \leq NA1t \cdot 1.1 \quad (6)$$

where $$NA1r \cdot \frac{410}{650} \cong 0.36, NA1t \cong 0.6$$

In brief, by establishing the relationships of formulae (5) and (6) by means of the opening limiting element 118, the reproduction signal capable of exactly reproducing information can be obtained from the second disk with use of the first optical disk apparatus.

The above description may be summarized as follows.

In the optical disk apparatus according to the present invention, the wavelength $\lambda 1$ of the semiconductor laser 115 is constant and the opening of the objective lens 119 can be switched by the opening limiting element 118 between the circular opening A with numerical aperture NA1$r$ in the disk radial direction and numerical aperture NA1$t$ in the track tangential direction and the elliptic opening B with numerical aperture NA2$r$ in the disk radial direction and numerical aperture NA2$t$ in the track tangential direction. Suppose that the degree of modulation and asymmetry of the reproduced signal, which is obtained from the first disk by the first optical disk apparatus having the light source with wavelength $\lambda 1$ and the objective lens with numerical aperture NA1$r$ in the disk radial direction and numerical aperture NA1$t$ in the track tangential direction, satisfy the above-mentioned conditions, M=0.2 or more and A=−0.05 to 0.15, and that the degree of modulation and asymmetry of the reproduced signal, which is obtained from the second disk by the second optical disk apparatus satisfy the same conditions. At this time, if the wavelength and numerical aperture (NA) meet the following relationship, $$0.95 \cdot \frac{\lambda 1}{\lambda 2} \cdot NA1r \leq NA2r \leq 1.1 \cdot \frac{\lambda 1}{\lambda 2} \cdot NA1r \quad (7)$$

$$0.95 \cdot NA1t \leq NA2t \leq 1.1 \cdot NA1t \quad (8)$$

a reproduction signal capable of exactly reproducing information can be obtained from each of the first and second disks by selecting, in the optical disk apparatus of this embodiment, the circular opening A in the case of reproducing information from the first disk or the elliptic opening B in the case of reproducing information from the second disk.

In fact, if the numerical apertures NA1$r$ and NA1$t$ are set to be equal to the numerical aperture NA of the objective lens 119 in the disk radial direction and track tangential direction (NA=NA1$r$=NA1$t$), the opening limiting element 118 may not have the circular opening A, as mentioned above. When information is to be reproduced from the first disk, the opening limiting element 118 may be set in such a state as to pass all the beam. When information is to be reproduced from the second disk, the elliptic opening B may be set on the light path to the objective lens.

The optical disk apparatus capable of reproducing information from two kinds of optical disks (first and second disks) with different recording densities has been described. The present invention, however, is applicable to reproduction of information from three or more kinds of optical disks wherein the pit length (in particular, minimum pit length), track pitch, etc. are optimized with respect to different light source wavelengths. In this case, it should suffice to use the opening limiting element 119 capable of switching three or more sets of numerical apertures in the disk radial direction and track tangential direction, including the numerical aperture of the objective lens 119 itself.

The opening limiting element for limiting the opening of the objective lens switches the opening in accordance with the optical disk to be reproduced, thereby optimizing the beam spot shape. Therefore, information can be exactly reproduced from plural kinds of optical disks with different recording densities.

Specifically, the optical disk apparatus with the light source wavelength of, e.g. 410 nm, can exactly reproduce information from either a relatively high-density optical disk optimized to match with this wavelength or a relatively low-density optical disk optimized at light source wavelength of 650 nm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus, comprising:
   a pick-up unit which reads out information from an optical disk, the information being recorded on the optical disk in a form of pits, and produces an information signal by photoelectric conversion;
   a first reproducer which processes the information signal by one of a waveform slice method and a PRML method, and produces a first reproduction signal;
   a second reproducer which detects a minimum value of a level of the information signal and produces a second reproduction signal; and
   a switch with selects, as a reproduction information signal, one of the first reproduction signal produced by the first reproducer and the second reproduction signal produced by the second reproducer, in accordance with a recording density of the optical disk to be produced,
   wherein the information is recorded on the optical disk by pulse width modulation recording, and the second reproducer comprises a differential circuit which differentiates the information signal, a rising zero-cross detector which detects a zero-cross point of a differential waveform, a rising detector which detects a rising of an output pulse from the rising zero-cross detector, and a PWM circuit which subjects an output signal from the rising detector to pulse width modulation.

2. The optical disk apparatus according to claim 1, wherein the second reproducer includes a correction circuit, provided at a rear stage of the PWM circuit, for correcting a PWM signal in accordance with record data.

3. The optical disk apparatus according to claim 2, wherein said correction circuit comprises a unit delay element which delays a bit signal of the PWM signal by one bit, and an OR gate which produces a logical sum between the bit signal of the PWM signal and the delayed bit signal.

4. The optical disk apparatus according to claim 2, wherein said correction circuit comprises a unit delay element which delays a bit signal of the PWM signal by one bit, and an AND gate which produces a logical product between the bit signal of the PWM signal and the delayed bit signal.

5. The optical disk apparatus according to claim 1, further comprising a filter which emphasizes one of an amplitude of the differential waveform and a peak of the reproduction waveform.

6. An optical disk apparatus, comprising:
- a pick-up unit which reads out information from an optical disk, the information being recorded on the optical disk in a form of pits, and produces an information signal by photoelectric conversion;
- a first reproducer which processes the information signal by one of a waveform slice method and a PRML method, and produces a first reproduction signal;
- a second reproducer which detects a minimum value of a level of the information signal and produces a second reproduction signal; and
- a switch with selects, as a reproduction information signal, one of the first reproduction signal produced by the first reproducer and the second reproduction signal produced by the second reproducer, in accordance with a recording density of the optical disk to be produced,
- wherein the pick-up unit includes a beam spot shape varying unit which selectively varies a shape of a beam spot in accordance with a location where the reproduction signal takes a minimum value.

7. An optical disk apparatus, comprising:
- a pick-up unit which reads out information from an optical disk, the information being recorded on the optical disk in a form of pits, and produces an information signal by photoelectric conversion;
- a first reproducer which processes the information signal by one of a waveform slice method and a PRML method, and produces a first reproduction signal;
- a second reproducer which detects a minimum value of a level of the information signal and produces a second reproduction signal; and
- a switch with selects, as a reproduction information signal, one of the first reproduction signal produced by the first reproducer and the second reproduction signal produced by the second reproducer, in accordance with a recording density of the optical disk to be produced,
- wherein the pick-up unit includes a beam spot shape varying unit which selectively varies a shape of a beam spot when tracking is performed.

* * * * *

UNITED STATES PATENT AND TRADEMARK OFFICE
CERTIFICATE OF CORRECTION

PATENT NO. : 6,456,578 B2
DATED : September 24, 2002
INVENTOR(S) : Iwata et al.

It is certified that error appears in the above-identified patent and that said Letters Patent is hereby corrected as shown below:

<u>Title page,</u>
Item [75], Inventors, please delete first inventor "Katsuo Iwata" and change to
-- Yutaka Kashihara, Tokyo (JP) --.

Signed and Sealed this

Twentieth Day of January, 2004

JON W. DUDAS
*Acting Director of the United States Patent and Trademark Office*